US006190019B1

(12) United States Patent
Hess

(10) Patent No.: US 6,190,019 B1
(45) Date of Patent: Feb. 20, 2001

(54) DISPLAY DEVICE WITH VISUAL EFFECT APPARATUS

(75) Inventor: Kristoffer Hess, Cambridge (CA)

(73) Assignee: Dimplex North America Limited, Cambridge (CA)

(*) Notice: Under 35 U.S.C. 154(b), the term of this patent shall be extended for 0 days.

(21) Appl. No.: 09/264,406

(22) Filed: Mar. 8, 1999

(51) Int. Cl.$^7$ .................................................. A47F 11/10
(52) U.S. Cl. ........................ 362/125; 362/101; 362/154; 119/258
(58) Field of Search ........................... 119/258; 362/125, 362/154, 234, 101, 253, 806

(56) References Cited

U.S. PATENT DOCUMENTS

| 1,199,882 | 10/1916 | Frey . | |
|---|---|---|---|
| 1,974,068 | 9/1934 | Greensaft | 119/5 |
| 2,286,246 | 6/1942 | Yearta | 40/132 |
| 2,963,807 | 12/1960 | Relph et al. | 40/106.53 |
| 3,119,371 | 1/1964 | Zuckerman | 119/5 |
| 3,395,476 | 8/1968 | Moss et al. | 40/106.54 |
| 3,451,877 | 6/1969 | Herschman | 161/3 |
| 3,730,138 | 5/1973 | Suchowski | 119/5 |
| 4,659,111 | 4/1987 | Credit | 283/81 |
| 4,673,609 | 6/1987 | Hill | 428/187 |
| 4,925,705 | 5/1990 | Hill | 427/259 |
| 5,090,357 | 2/1992 | Pucci | 119/5 |
| 5,214,539 | 5/1993 | Sorko-Ram | 359/839 |
| 5,265,360 | 11/1993 | Reiss et al. | 40/427 |
| 5,525,177 | 6/1996 | Ross | 156/240 |
| 5,649,757 | * 7/1997 | Aleman et al. | 362/101 |
| 5,743,038 | 4/1998 | Soto | 40/743 |
| 5,787,618 | 8/1998 | Mullis | 40/219 |

FOREIGN PATENT DOCUMENTS

| 2 118 096 | 2/1983 | (GB) | B32B/06/27 |
|---|---|---|---|
| 55-76464 | 6/1980 | (JP) . | |
| 57-14101 | 6/1982 | (JP) . | |
| WO 97/41393 | 11/1997 | (WO) | F24C/7/00 |

* cited by examiner

Primary Examiner—Stephen Husar

(57) ABSTRACT

An apparatus for producing an visual effect of increased depth is provided. The apparatus provides a reflection of an image applied to a substantially transparent panel to create the effect of increased distance between the panel and the reflective surface. The apparatus may be advantageously employed in terrariums, vivariums, aquariums, merchandise displays, timepieces, instrument panels, display boards and the like.

18 Claims, 5 Drawing Sheets

DISPLAY DEVICE WITH VISUAL EFFECT APPARATUS

FIELD OF THE INVENTION

The present invention relates generally to display devices and more particularly, to an apparatus for creating an illusory visual effect such as increased depth in such devices.

BACKGROUND OF THE INVENTION

Animals, such as pets and zoo specimens, have long been maintained and displayed in containers such as aquariums and terrariums, comprising at least one transparent panel which permits viewing of the animals inside by persons outside of the container. Similarly, inanimate objects, such as store merchandise, museum artifacts and the hands of a clock have been displayed in cases having one or more transparent panels to permit viewing and to protect the objects.

Economy of space often requires that containers such as these be quite limited in size. The small size often results in the objects displayed in the container appearing somewhat crowded together. Furthermore, any environmental or ornamental additions made to the container, to increase the attractiveness of the display or otherwise, only serves to further crowd the objects being displayed. Accordingly, there is a need for an apparatus for conveying an impression of increased size or depth of the container without modification to the actual dimensions of the container.

SUMMARY OF THE INVENTION

The present invention is directed to an apparatus for creating an illusion of increased depth in articles having a visual display aspect thereto.

In one aspect, the invention provides a container for displaying a specimen comprising a substantially transparent panel having a first surface and a second surface; a substantially reflective surface opposing and spaced apart from said first surface of said panel; a pattern applied to said panel whereby said pattern is substantially invisible through said second surface but visible as a reflection in said reflective surface.

In a second aspect, the invention provides a container for displaying merchandise comprising a substantially transparent panel having a first surface and a second surface; a substantially reflective surface opposing and spaced apart from said first surface of said panel; a pattern applied to said panel whereby said pattern is substantially invisible through said second surface but visible as a reflection in said reflective surface.

In a third aspect, the invention provides a time piece comprising a substantially transparent panel having first and second surfaces, a substantially reflective surface opposing and spaced apart from said first surface of said panel time keeping means disposed in said time piece for keeping time, time display means connected to said time keeping means for displaying said time, said time display means interposed between said panel and said reflective surface; and a pattern applied to said panel whereby said pattern is substantially invisible through said second surface but visible as a reflection in said reflective surface.

In a fourth aspect, the invention provides a display device for displaying a graphic comprising a substantially transparent panel having a first surface and a second surface, a substantially reflective surface opposing and spaced apart from said first surface of said panel; a pattern applied to said panel whereby said pattern is substantially invisible through said second surface but visible as a reflection in said reflective surface.

BRIEF DESCRIPTION OF THE DRAWINGS

For a better understanding of the present invention, and to show more clearly how it may be carried into effect, reference will now be made, by way of example, to the accompanying drawings. The drawings show preferred embodiments of the present invention, in which.

DETAILED DESCRIPTION OF THE PREFERRED EMBODIMENT

Figure 1:
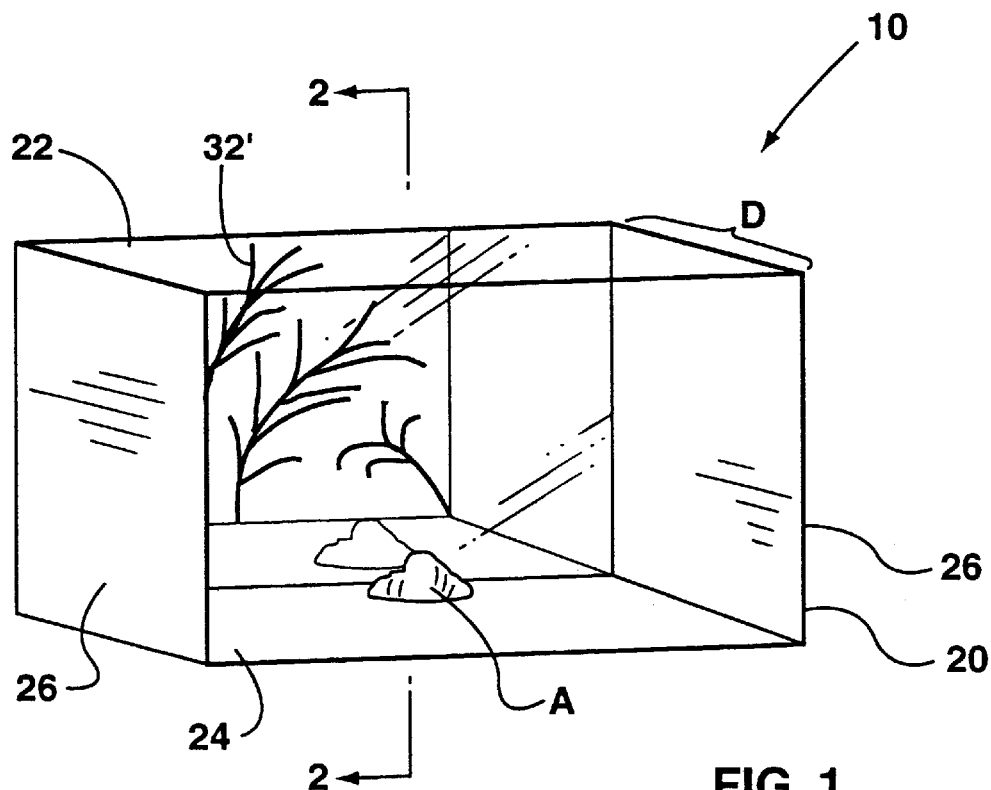
FIG. 1 is an isometric view of an article incorporating a visual effect assembly in accordance with the present invention.

A container incorporating a visual effect apparatus in accordance with the present invention is shown generally at 10 in the figures. Container 10 comprises a transparent viewing panel 20, a reflective surface 22, bottom 24 and side 26. Front panel 20 and reflective surface 22 are spaced apart by a distance D. Object A represents an article or animal housed in container 10.

Figure 2:
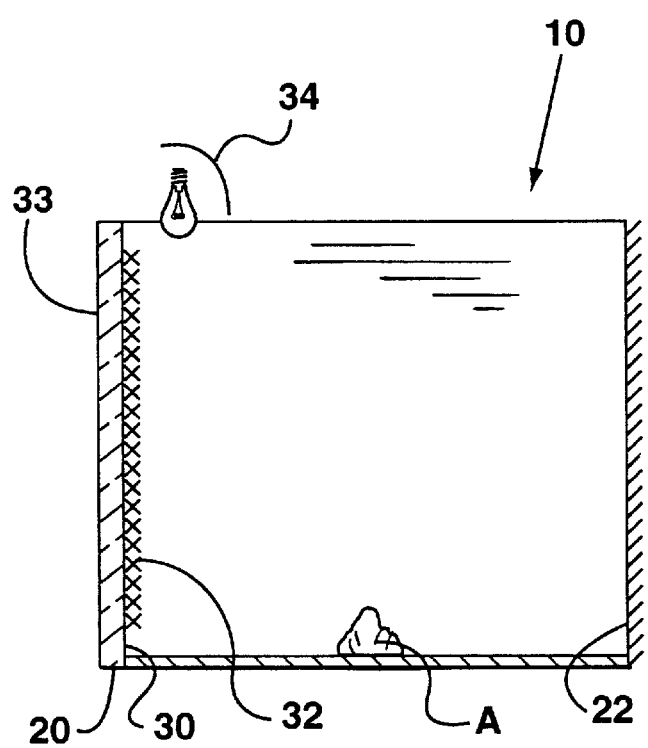
FIG. 2 is a side view of the assembly of FIG. 1, taken through the line 2—2.

Referring to FIG. 2, transparent panel 20 has a first surface to which is applied a visual pattern 32. It will be understood that a second surface 33 of panel 20 may instead be used or the pattern 32 may be incorporated between the first and second surfaces of the panel 20 (such as by sandwiching the pattern between two panel portions). Pattern 32 preferably comprises a series of coloured dots arranged in a random pattern. The dots are applied in such a manner, as will be described below, that an observer positioned in front of the second surface 33 of the transparent panel 20, and looking therethrough into container 10, will not readily notice pattern 32. Rather, the observer will notice only the reflection 32' of pattern 32 in reflecting surface 22. The reflection 32' of pattern 32 in reflecting surface 22 will appear behind object A, at a distance twice that of distance D, thereby giving the impression of increased volume within container 10.

To enhance the intensity of the reflection of pattern 32 on reflecting surface 22, a light source 34 is preferably provided inside container 10 adjacent inner surface 30. For convenience, light source 34 is preferably positioned towards the top of panel 20 so as not to interfere with the object A being displayed or housed in container 10.

Figure 3:
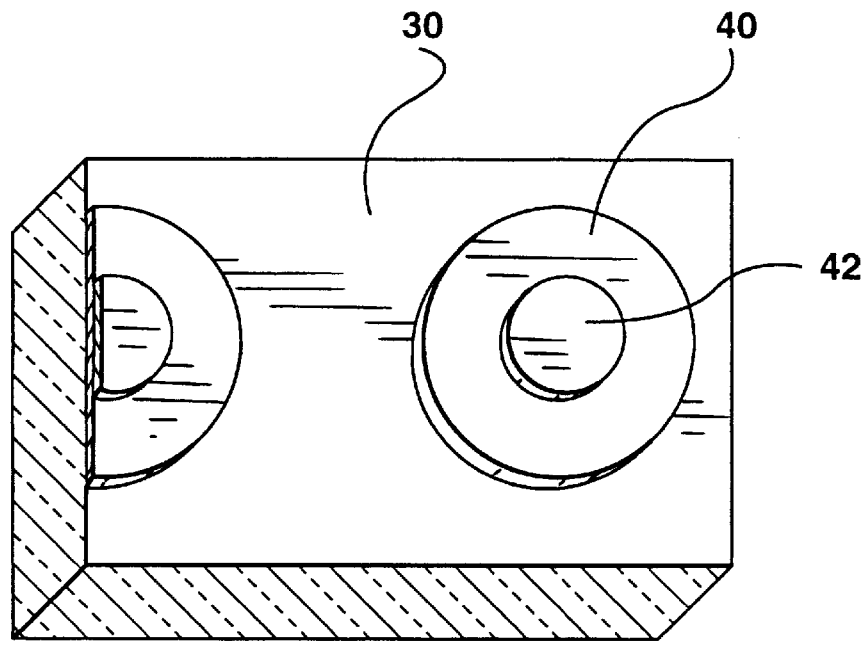
FIG. 3 is an enlarged isometric view of a portion of the transparent panel of the apparatus of FIG. 1.

Referring to FIG. 3, a preferred embodiment of the application of pattern 32 to panel 20 is shown. The method used to apply pattern 32 in this embodiment is described below, and is similar to that described in U.S. Pat. No. 4,925,705, which is incorporated herein by reference. First, a pattern of dots 40 is applied to the inner surface of panel 20. The density and size of dots 40 are preferably chosen such that the presence of the dots 40 is not readily noticeable to an observer, the only effect imparted to transparent panel 20 by the presence of dots 40 being a smoked or tinted appearance, when viewed through surface 33. This effect is best achieved if the dots 40 are dark, and preferably black, in colour, small in size, positioned randomly and spaced at a constant density per square inch. It will be understood when referring to "dots" the dots need not be round in shape but may be any configuration, as known in the art, to minimize the discernability of the pattern other than by reflection.

By locating dots 40 randomly across the inner surface of panel 20, a visible interference pattern is avoided. If dots 40 are regularly located, an interference pattern caused between dots 40 and the reflection of dots 40 on reflecting surface 22 becomes noticeable to an observer. This interference pattern is distracting and reduces the realism of the overall visual effect. It is desirable, therefore, to apply dots 40 randomly on surface 30. A constant dot density per square inch is preferred to ensure that the smoked or tinted appearance which dots 40 impart is constant across panel 20.

Preferably dots 40 are applied to the inner surface of panel 20 by silk screening. Once dots 40 have been applied, corresponding dots 42 are applied over dots 40. Dots 42 are preferably of slightly smaller diameter than, and located away from the edges of, dots 40. This ensures that an observer positioned in front of container 10 will not notice the presence of dots 42, and therefore pattern 32, on transparent panel 20. Dots 42 are preferably coloured and, although each dot 42 is preferably a single colour, a variety of colours may be used. The colour of a particular dot 42 is chosen such that pattern 32 is formed by dots 42 on the inner surface of panel 20.

In use, the presence of the dots 40 and 42 on the inner surface of transparent panel 20 is not readily noticed by an observer positioned in front of container 10, however, the reflection of the dots 42 in reflecting surface 22 is readily apparent to the observer. A simulated image 32' is created by the reflection of pattern 32 in reflecting surface 22 which appears to be located behind panel 20, at twice the distance D between panel 20 and reflecting surface 22.

It will be apparent that pattern 32 can be applied using one of several available means to panel 20. For example, a CLEAR FOCUS™ one-way vision display panel (not shown), as described in U.S. Pat. No. 5,525,177, may be used. Pattern 32 may be applied to the display surface of a CLEAR FOCUS™ panel which is, in turn, applied to panel 20, such that an observer positioned in front of container 10 cannot see pattern 32 directly, but can view the reflection 32' in reflecting surface 22.

Figure 4:
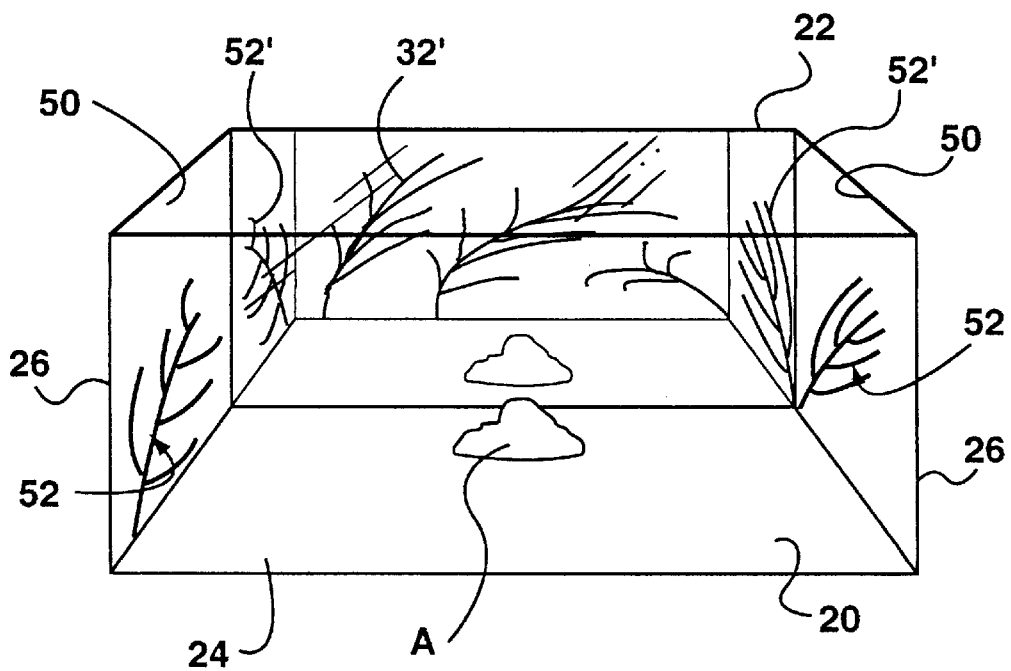
FIG. 4 is a perspective front view of an alternate embodiment of the present invention.

Referring to FIG. 4, inner surfaces 50 of sides 26 may optionally have a side pattern 52 applied thereto which is reflected on surface 22 as reflection 52'. The design and colours chosen for side patterns 52 are preferably visually compatible with those used for pattern 32. The patterns 32 and 52 are positioned on the inner surface of panel 20 and side walls 26, respectively, such that the apparent features of the designs of side patterns 52 and reflections 52' merge or cooperate, thereby appearing to be contiguous with or complementary to, reflected image 32'.

In another embodiment, transparent panel 20 is replaced by a mesh screen (not shown), and pattern 32 is applied, with paint or similar means, to the inner surface of the screen. If care is used to ensure that the pattern 32 is applied only to the interior surface of the screen, the pattern 32 will not be directly visible to an observer standing in front of container 10. The observer will, however, be able to view the reflection 32' on reflecting surface 22.

Figure 5:
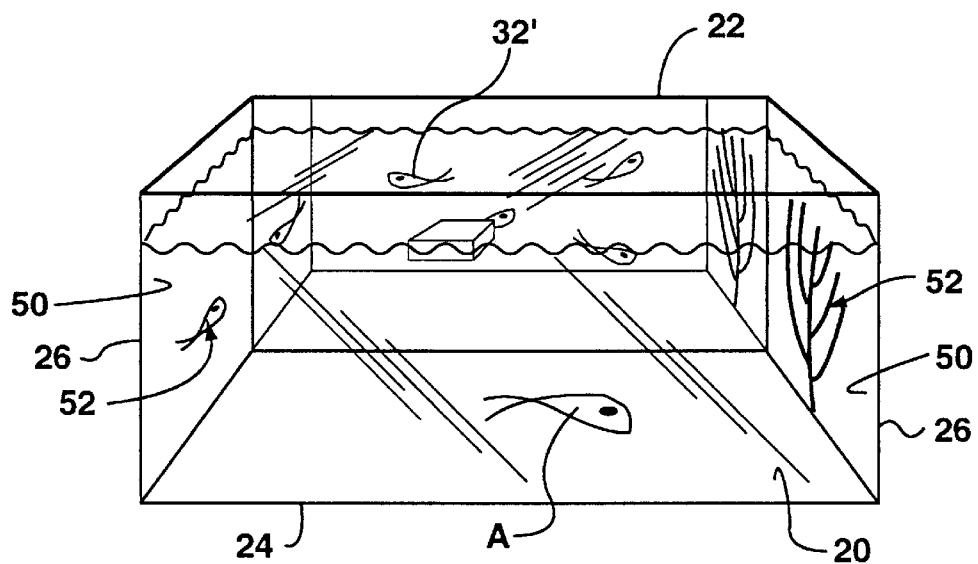
FIG. 5 is a perspective front view of a second alternate embodiment of the present invention.
Figure 6:
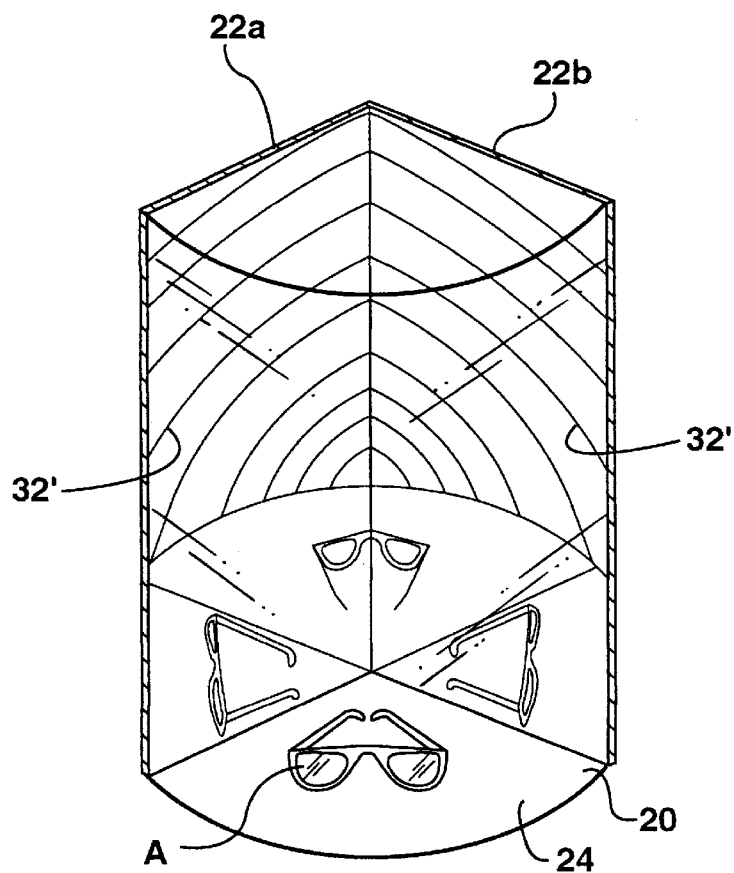
FIG. 6 is a perspective front view of a third alternate embodiment of the present invention.

As shown in FIGS. 5–10, container 10 need not be prismatic nor have planar surfaces. Moreover, various alterations, such as the use of cooperating reflecting surfaces 22a and 22b, as shown in FIG. 6, may be employed without departing from the scope of the present invention.

Figure 8:
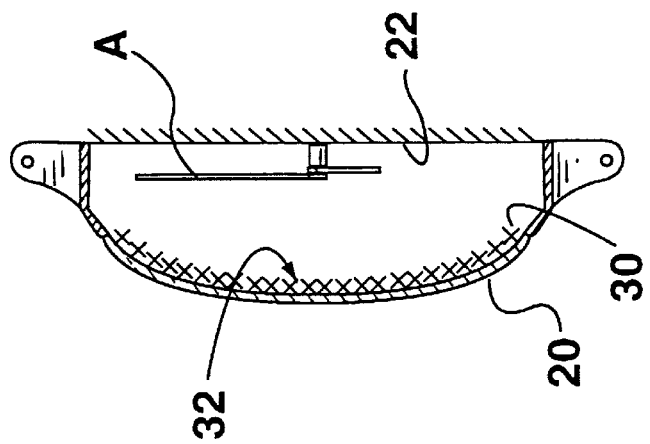
FIG. 8 is a side view of the embodiment of FIG. 7, taken through the line 8—8.
Figure 7:
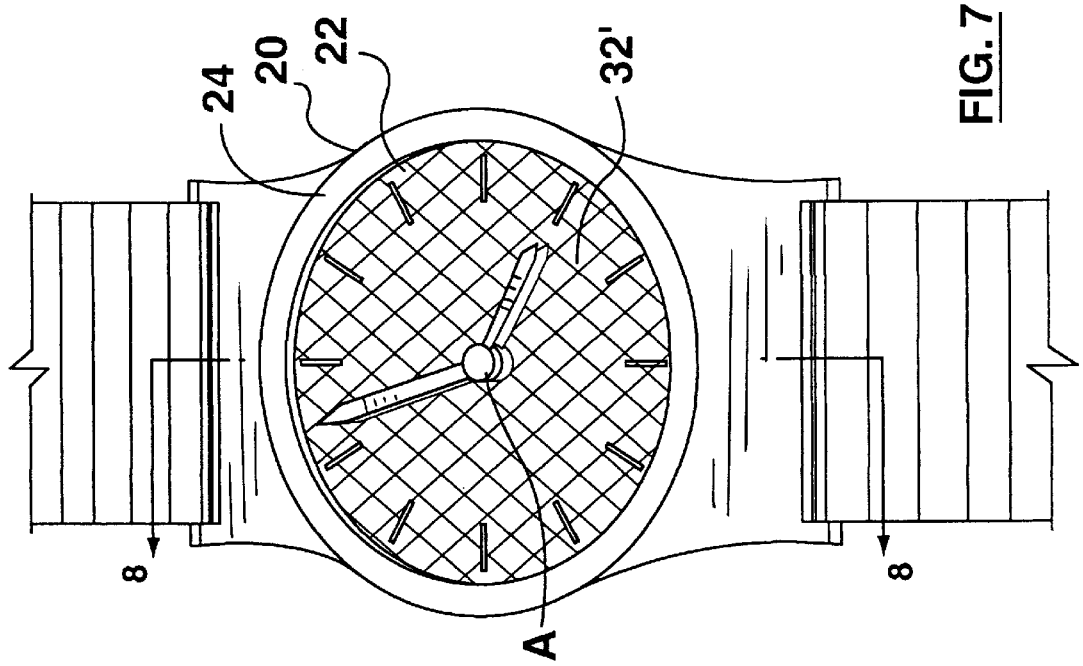
FIG. 7 is a perspective front view of a fourth alternate embodiment of the present invention.
Figure 10:
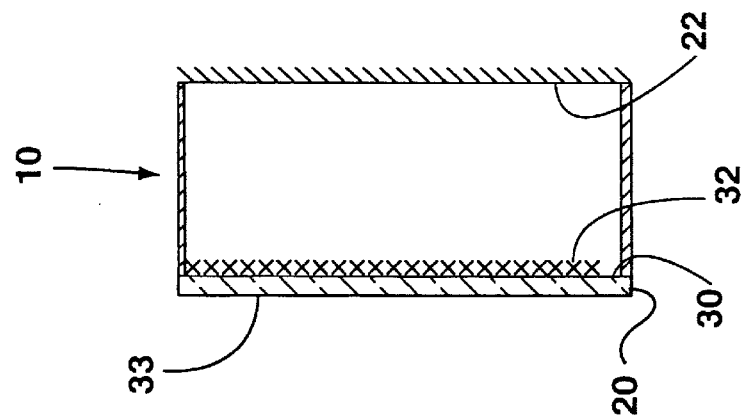
FIG. 10 is a side view of the embodiment of FIG. 9, taken through the line 10—10.
Figure 9:
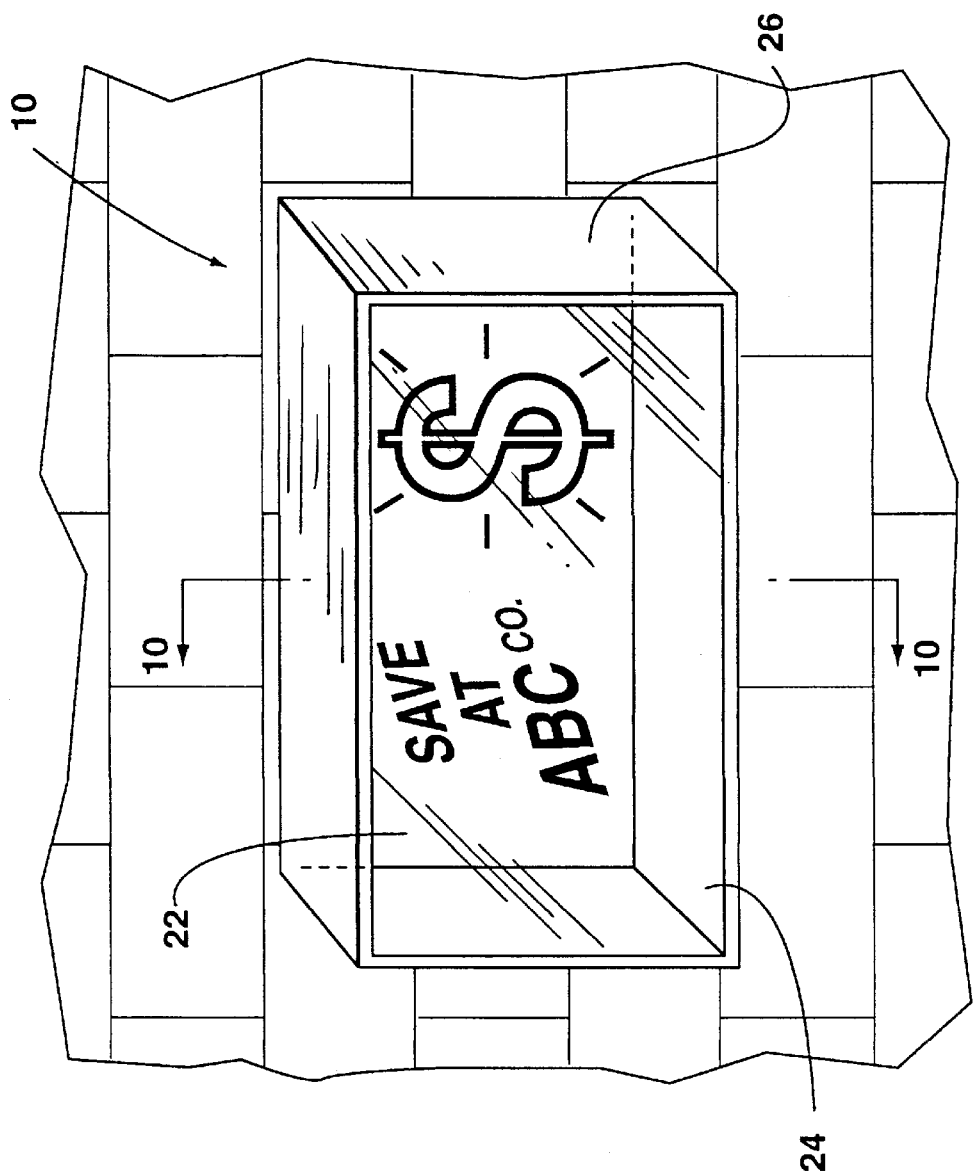
FIG. 9 is a perspective front view of a fifth alternate embodiment of the present invention.

The apparatus of the present invention could be used successfully with any container or article having a panel 20 and reflecting surface 22. In particular, the apparatus of the present invention could be used to enhance the appearance of plant terrariums and animal vivariums, as shown in FIGS. 1 and 4, or aquatic aquariums, as shown in FIG. 5. As shown in FIG. 6, the present invention may also be used in display cases for merchandise, museum artifacts or dioramas, and the like. Furthermore, the present invention may be used to enhance the readability and/or functionality of instrument panels and other quantitative instruments or to give a pleasing aesthetic effect to jewellery items such as wristwatches, as shown in FIGS. 7 and 8. Referring to FIGS. 9 and 10, the invention may be employed for use in signage to create an eye-catching effect for advertisements and the like. Still other uses may be envisioned which will fall within the scope of the present invention.

Advantageously, the visual effect of the present invention permits the depth of a container, or other device, to be decreased, as a space-saving measure, without alerting an observer to such decrease. Also, a reflective pattern behind an instrument display may be used to enhance the readability of the display or to produce a pleasing aesthetic effect. Moreover, the depth-effect of the present invention creates a visual effect which is intriguing and catches the eye.

It is to be understood that what has been described is a preferred embodiment to the invention. The invention nonetheless is susceptible to certain changes and alternative embodiments fully comprehended by the spirit of the invention as described above, and the scope of the claims set out below.

I claim:

1. A container for displaying a living specimen comprising a substantially transparent panel having a first surface and a second surface; a substantially reflective surface opposing and spaced apart from said first surface of said panel; a pattern applied to said panel whereby said pattern is substantially invisible through said second surface but visible as a reflection in said reflective surface.

2. A container as claimed in claim 1, further comprising a light source mounted relative to said container for illuminating the pattern applied to said panel.

3. A container as claimed in claim 1 further comprising at least one side wall interposed between the panel and the reflective surface, said at least one side wall having a pattern applied thereto for reflecting in said reflective surface.

4. A container as claimed in claim 3, wherein said pattern applied to said at least one side wall substantially matches said pattern applied to said panel, as reflected in said reflective surface.

5. A container as claimed in claim 1, wherein said pattern is defined by a plurality of dots.

6. A container as claimed in claim 5, wherein said dots are randomly disposed on said panel to avoid an interference pattern being formed.

7. A container as claimed in claim 6, wherein said dots are arranged in a sufficiently constant density to produce a substantially constant tinted appearance to the portion of said panel showing said pattern when observed through said second surface.

8. A container as claimed in claim 5, wherein said dots are substantially uniform in size.

9. A container as claimed in claim 5, wherein said dots are round.

10. A container as claimed in claim 5, wherein said dots comprise first dots applied to said panel and second dots applied to said first dots, said second dots being smaller than said first dots.

11. A container as claimed in claim 1, wherein said image is defined by a one-way vision display panel.

12. A container as claimed in claim 1, wherein said front wall is a mesh screen.

13. A container as claimed in claim 1 wherein said pattern is applied to said first surface of said panel.

14. A container as claimed in claim 1 wherein the reflective surface is planar.

15. A container as claimed in claim 1 wherein the panel is planar.

16. A container as claimed in claim 15 wherein the panel and the reflective surface are parallel to each other.

17. A container for displaying merchandise comprising a substantially transparent panel having a first surface and a second surface; a substantially reflective surface opposing and spaced apart from said first surface of said panel; a pattern applied to said panel whereby said pattern is substantially invisible through said second surface but visible as a reflection in said reflective surface.

18. A container as claimed in claim 17 further comprising at least one side wall interposed between the panel and the reflective surface, said at least one side wall having a pattern applied thereto for reflecting in said reflective surface.

* * * * *